US012649206B2

(12) United States Patent

Casaulta

(10) Patent No.: US 12,649,206 B2

(45) Date of Patent: Jun. 9, 2026

(54) CONVERTIBLE GRIPPING DEVICE

(71) Applicant: REISHAUER AG, Wallisellen (CH)

(72) Inventor: Patrick Casaulta, Küsnacht (CH)

(73) Assignee: REISHAUER AG, Wallisellen (CH)

( * ) Notice: Subject to any disclaimer, the term of this patent is extended or adjusted under 35 U.S.C. 154(b) by 869 days.

(21) Appl. No.: 17/927,583

(22) PCT Filed: Jul. 2, 2021

(86) PCT No.: PCT/EP2021/068422
§ 371 (c)(1),
(2) Date: Nov. 23, 2022

(87) PCT Pub. No.: WO2022/008391
PCT Pub. Date: Jan. 13, 2022

(65) Prior Publication Data

US 2023/0211510 A1 Jul. 6, 2023

(30) Foreign Application Priority Data

Jul. 8, 2020 (CH) ..................................... 00844/20

(51) Int. Cl.
B23Q 7/04 (2006.01)
B23F 23/12 (2006.01)
(Continued)

(52) U.S. Cl.
CPC .............. B23Q 7/048 (2013.01); B23F 23/12 (2013.01); B25J 15/0061 (2013.01); B25J 15/106 (2013.01)

(58) Field of Classification Search
CPC ... B23Q 7/048; B25J 15/0061; B25J 15/0052; B25J 15/106
See application file for complete search history.

(56) References Cited

U.S. PATENT DOCUMENTS 2,736,238 A * 2/1956 Moncrieff ............... B23F 23/04
409/6
4,443,021 A 4/1984 Buchholz et al.
(Continued)

FOREIGN PATENT DOCUMENTS

CN 102886668 A 1/2013
CN 103786160 A 5/2014
(Continued)

OTHER PUBLICATIONS

Product information "Universal gripper PGN-Plus-P 380" from Schunk GmbH & Co. Kg, DE-74348 Lauffen, 18 pages.
(Continued)

*Primary Examiner* — Thomas E Lazo
(74) *Attorney, Agent, or Firm* — Sughrue Mion, PLLC

(57) ABSTRACT

A gripping device having a holder and two gripper units. Each of the gripper units has a base body and two base jaws. The base jaws can be moved synchronously in opposite directions relative to the respective base body. The gripper units are arranged side by side on the holder so that the base jaws of both gripper units can be moved parallel to a common gripper plane. The gripping device is designed as a single gripper in that only a first gripper finger is attached to each of the two outer base jaws. It can very easily be converted to a double gripper by attaching two further gripper fingers to the inner base jaws, or by removing the first gripper fingers and attaching a second gripper finger to each of the four base jaws.

17 Claims, 4 Drawing Sheets

(51) Int. Cl.
  *B25J 15/00* (2006.01)
  *B25J 15/10* (2006.01)

(56) References Cited

U.S. PATENT DOCUMENTS

| | | | | | |
|---|---|---|---|---|---|
| 4,518,187 | A | * | 5/1985 | Blatt | B25J 15/028 |
| | | | | | 294/207 |
| 4,519,733 | A | * | 5/1985 | Gregg | B23F 23/04 |
| | | | | | 198/346.2 |
| 5,088,783 | A | * | 2/1992 | Squires | B66C 1/447 |
| | | | | | 414/626 |
| 8,210,586 | B2 | * | 7/2012 | Hawes | B25J 15/0253 |
| | | | | | 294/86.4 |

FOREIGN PATENT DOCUMENTS

| | | | | | |
|---|---|---|---|---|---|
| CN | 103921162 A | * | 7/2014 | ............ | B23Q 7/048 |
| CN | 107962409 A | | 4/2018 | | |
| CN | 210650731 U | | 6/2020 | | |
| DE | 29500340 U1 | | 3/1995 | | |
| DE | 10213127 C1 | | 6/2003 | | |
| FR | 2510928 A1 | | 2/1983 | | |
| WO | WO-2021167859 A1 | * | 8/2021 | ............ | B25J 15/08 |

OTHER PUBLICATIONS

International Search Report of PCT/EP2021/068422 dated Oct. 12, 2021 [PCT/ISA/210].
Communication dated Dec. 22, 2025 in Chinese Application No. 202180047962.0.

\* cited by examiner

CONVERTIBLE GRIPPING DEVICE

CROSS REFERENCE TO RELATED APPLICATIONS

This application is a National Stage of International Application No. PCT/EP2021/068422 filed on Jul. 2, 2021, claiming priority based on Swiss Patent Application No. 00844/20 filed on Jul. 8, 2020.

TECHNICAL FIELD

The present invention relates to a gripping device, a machine tool equipped therewith, a use of such a gripping device, and a method for its operation.

PRIOR ART

So-called two-jaw parallel grippers are known from the prior art. A two-jaw parallel gripper has a base body and two gripper jaws. The gripper jaws can be moved linearly on the base body synchronously towards and away from each other. The drive for this stroke movement can be pneumatic or electric, for example. Two-jaw parallel grippers are available, for example, from Zimmer Group GmbH, DE-77866 Rheinau, as "Series GPP5000" (pneumatic) and "Series GEP5000" (electric) in different sizes, with different stroke ranges and different ranges for the gripping force. The jaws can be preloaded by a return spring in the direction of the open or closed position. A pneumatically driven two-jaw parallel gripper is also known from the product information "Universal gripper PGN-Plus-P 380" from Schunk GmbH & Co. KG, DE-74348 Lauffen.

Also known from the prior art are so-called two-jaw angular grippers. In these, the gripper jaws are swiveled synchronously toward and away from each other about two parallel swivel axes. The "Series GPW5000" from Zimmer Group GmbH is mentioned as an example. In the following, two-jaw parallel grippers and two-jaw angular grippers are generally referred to as two-jaw grippers.

In the prior art, it has been proposed to arrange two individual two-jaw grippers on a common holder to form a double gripper. For example, in DE29500340U1 it is proposed to arrange two two-jaw angular grippers either at an angle to each other or parallel next to each other on a common holder.

An important area of application for grippers is handling devices for changing workpieces on a machine tool, in particular for changing gears on a gear cutting machine. The handling device is used to move workpieces between a workpiece spindle and a workpiece rest. For this purpose the workpieces are gripped by a gripper of the handling device.

To minimize the cycle times of a machine tool, handling devices with double grippers are occasionally used. One two-jaw gripper is used to remove a finished workpiece (finished part) from the workpiece spindle, while the other two-jaw gripper holds the next blank ready. The handling device then moves the double gripper into a position in which it transfers the blank to the workpiece spindle. Subsequently, the handling device moves the double gripper into a position in which the double gripper deposits the finished part in a workpiece rest and picks up the next blank. This can save a considerable amount of time compared to a single gripper.

While handling devices with double grippers are mainly used for workpieces with small diameters, they often cannot be used for larger workpieces for reasons of space. Therefore, if both small and large workpieces are to be processed on the same machine, either the advantages of a double gripper have to be dispensed with, or a time-consuming exchange or conversion of the entire handling device has to be carried out each time.

SUMMARY OF THE INVENTION

It is an object of the present invention to provide a gripping device which can be used for workpieces of different sizes, the gripping device allowing its modification for smaller workpieces in such a way that it permits a particularly fast workpiece change.

A gripping device is proposed which comprises a holder and two gripper units. Each of the gripper units has a base body with its own drive and two base jaws. The base jaws can be moved synchronously in opposite directions relative to the base body by the drive. The two gripper units are arranged next to one another on the holder in such a way that the base jaws of both gripper units can be moved parallel to a common gripper plane. One of the base jaws of each gripper unit forms an inner base jaw, and the other base jaw of each gripper unit forms an outer base jaw. The inner base jaws of the two gripper units are arranged between the outer base jaws. The gripping device is formed as a single gripper in that a first gripper finger is attached to each of the outer base jaws, so that a first object can be picked up with the first gripper fingers, while the inner base jaws do not carry gripper fingers for picking up objects.

Two gripper units are thus provided side by side on a common holder, which may be designed as a swivel arm, for example. Such a design is in itself characteristic of a double gripper. However, the gripping device is not operated as a double gripper, but as a single gripper. Only the outer base jaw of each gripper unit is used, while the inner base jaws do not participate in the gripping process. The outer base jaws of the two gripper units are spaced further apart from one another than the two base jaws of each individual gripper unit. This allows larger objects (especially workpieces) to be picked up by the gripping device than by a single gripper unit. Since each of the two gripper units has its own drive and, if necessary, its own return spring, twice as much gripping force can be generated as with a single gripper unit. This is particularly advantageous for large objects.

Preferably, the gripping device comprises a controller which is configured to control the drives of the two gripper units in a first operating mode in a coupled manner such that the outer base jaws of the two gripper units are moved synchronously in opposite directions in order to pick up or deposit an object.

The gripping device can be easily converted to a double gripper by attaching two additional first gripper fingers to the inner base jaws, or by removing the two first gripper fingers from the outer base jaws and attaching a second gripper finger to each of the outer and inner base jaws, the second gripper fingers being designed to pick up other, usually smaller, objects. In this manner, each of the two gripper units may be used to pick up a second object independently of the other gripper unit.

The gripping device may accordingly comprise, in the sense of a kit, the further gripper fingers that are required for conversion to operation as a double gripper. In particular, the gripping device may comprise the two further first gripper fingers mentioned or the four second gripper fingers mentioned. These may be attached to the corresponding base jaws for double gripper operation, while they are removed from the base jaws in single gripper operation.

Accordingly, the controller for double gripper operation may advantageously be switched to a second operating mode in which it controls the two gripper units independently of each other.

In order to be able to reliably determine the operating state of the gripping device, each of the gripper units may have a position sensing device which is designed to determine a position of a target on one of the gripper fingers. Preferably, this is the respective outer gripper finger, i.e. the gripper finger that is attached to the respective outer base jaw. In this way, the position of the two outer base jaws can be reliably determined both in single-gripper operation and in double-gripper operation.

In particular, the position sensing device may comprise an inductive position sensor. In this case, the target is preferably a target made of a soft magnetic material. However, other measuring principles are also conceivable, e.g. an optical distance sensor or an eddy current sensor.

The base jaws are preferably linearly displaceable relative to the base body of the respective gripper unit, i.e., the respective gripper unit forms a two-jaw parallel gripper. Alternatively, the base jaws may be capable of being swiveled relative to the base body, i.e., the respective gripper unit may form a two-jaw angular gripper.

The drive for the base jaws of each gripper unit may be actuated, in particular, pneumatically or electrically. The base jaws may be mechanically coupled to the drive in such a way that they forcibly execute the synchronous opposing movement when the drive is actuated. Each gripper unit may have a return spring to preload the gripper jaws in the direction of the closed or open position of the base jaws in the drive-free state.

The first and second gripper fingers may be configured to pick up various types of objects. One important class of objects are workpieces for machine tools. In preferred embodiments, the gripper fingers are designed to pick up toothed workpieces, in particular externally toothed gears (spur gears). In this case, the workpieces are picked up between the gripper fingers by synchronously moving two gripper fingers towards each other. Each gripper finger has a gripper jaw oriented inwards towards the workpiece, which is designed in such a way that, as a result of this movement, the gripper jaws hold the workpiece at its outer circumference in a force-fit by means of an inwardly directed gripping force. However, it is also conceivable to use the gripping device to pick up annular, in particular internally toothed, workpieces at the inner circumference. For this purpose, the gripper fingers may have gripper jaws or gripper bolts oriented correspondingly outwardly, which are designed in such a way that, as a result of an outward movement of the gripper fingers in the opposite direction, they hold the workpiece at its inner circumference in a force-fit by means of an outwardly directed gripping force.

Preferably, the gripper fingers are of modular design to enable particularly fast and flexible adaptation to different types of workpieces. For this purpose, each of the first and/or second gripper fingers has a base finger and a gripper jaw formed separately therefrom. The base finger may be detachably connected to one of the base jaws, in particular at its proximal end. The gripper jaw is releasably connected to the base finger, in particular in an area between the proximal and distal ends of the base finger. In this way, the gripper jaws can be replaced very easily and quickly in order to adapt the device to a different workpiece.

A particularly fast change of the gripper jaws is possible if the respective gripper jaw can be connected to the associated base finger by a detachable snap connection.

In an advantageous embodiment, the gripper jaw has at least one fastening cam for this purpose. The base finger defines a finger longitudinal direction. It has a lateral insertion opening extending transversely to the longitudinal direction of the finger, into which the at least one fastening cam of the gripper jaw can be inserted transversely to the longitudinal direction of the finger. A spring-loaded fixing pin with a latching projection is attached to the base finger. The latching projection may be formed, for example, by a transverse pin extending transversely through the fixing pin. At least the latching projection extends into the insertion opening. It engages in a recess of the fixing cam when the fixing cam is inserted into the insertion opening to establish the releasable snap connection. The fixing pin defines a pin longitudinal axis. The fixing pin is displaceable along the pin longitudinal axis relative to the base finger. It extends into a region outside the base finger. In this region, an actuating element is formed on the fixing pin or connected to the fixing pin. The actuating element may be designed in particular as a disk or cap which forms a contact surface for a finger of the user. The releasable snap connection may be released again by axial pressure on the actuating element and the resulting displacement of the fixing pin along its pin longitudinal axis. The fixing pin may be surrounded by a helical spring in the region outside the base finger. The spring may be compressible between an outer surface of the base finger and a counter stop attached to the fixing pin, which may be formed on the actuating element, for example, in order to apply a spring force to the fixing pin in the direction of the position in which it fixes the at least one fastening cam. Preferably, the gripper jaw has two parallel fixing cams, and the fixing pin extends in the inserted state through a region of the insertion opening located between the fixing cams. Accordingly, the fixing pin has two latching projections which extend symmetrically to the longitudinal axis of the fixing pin transversely to the pin longitudinal axis. In this case in particular, it is advantageous if the latching projections are formed on both sides of the fixing pin by a transverse pin which extends transversely through the fixing pin.

The gripping device may be used particularly advantageously in a gear cutting machine to handle toothed workpieces, in particular for workpiece exchange, i.e. to feed blanks to the gear cutting machine and to remove finished parts from the gear cutting machine.

Accordingly, the present invention also relates to a gear cutting machine comprising a gripping device of the type mentioned above.

The present invention further provides a method for operating a gripping device of the above type. In this method, in single-gripper operation, an object is picked up by the first gripper fingers by controlling the drives of the two gripper units in a coupled manner such that the outer base jaws of the two gripper units are moved synchronously in opposite directions.

The method may further comprise converting the gripping device from a single gripper to a double gripper either by attaching two additional first gripper fingers to the inner base jaws, or by removing the two first gripper fingers from the outer base jaws and attaching a second gripper finger to each of the outer and inner base jaws.

After conversion to a double gripper, the process may include picking up objects with the two gripper units independently of each other. For this purpose, the drives of the two gripper units are controlled in such a way that the base jaws of each of the two gripper units are moved synchronously in opposite directions independently of the base jaws of the respective other gripper unit.

The method may include, in single-gripper operation and/or double-gripper operation, determining a position of one target on each of the gripper fingers mounted on the outer base jaws of the two gripper units.

BRIEF DESCRIPTION OF THE DRAWINGS

Preferred embodiments of the invention are described below with reference to the drawings, which are for explanatory purposes only and are not to be construed to be limiting. In the drawings.

DESCRIPTION OF PREFERRED EMBODIMENTS

Single Gripper Unit

Figure 1:
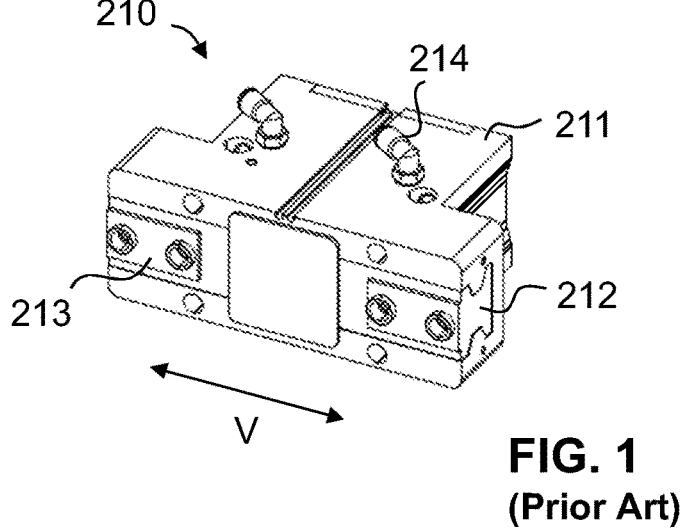
FIG. 1 shows an enlarged view of a single gripper unit known per se.

FIG. 1 shows a gripper unit 210 known per se from the prior art. The gripper unit is a pneumatically driven two-jaw parallel gripper, as it is commercially available in many different variants. The gripper unit 210 comprises a base body 211 in which a pneumatic drive, which is not shown separately, is accommodated. Compressed air is supplied to the drive via hose connections 214. The gripper unit 210 further comprises two base jaws 212, 213, which are guided collinearly along a displacement direction V on the base body 211. The base jaws 212, 213 are synchronously displaceable towards or away from each other in opposite directions relative to the base body 210 by the drive. Depending on the embodiment, a return spring may be present in the base body 210, which applies a closing or opening return force to the base jaws 212, 213 in the drive-free state.

Double Gripper Design

Figure 2:
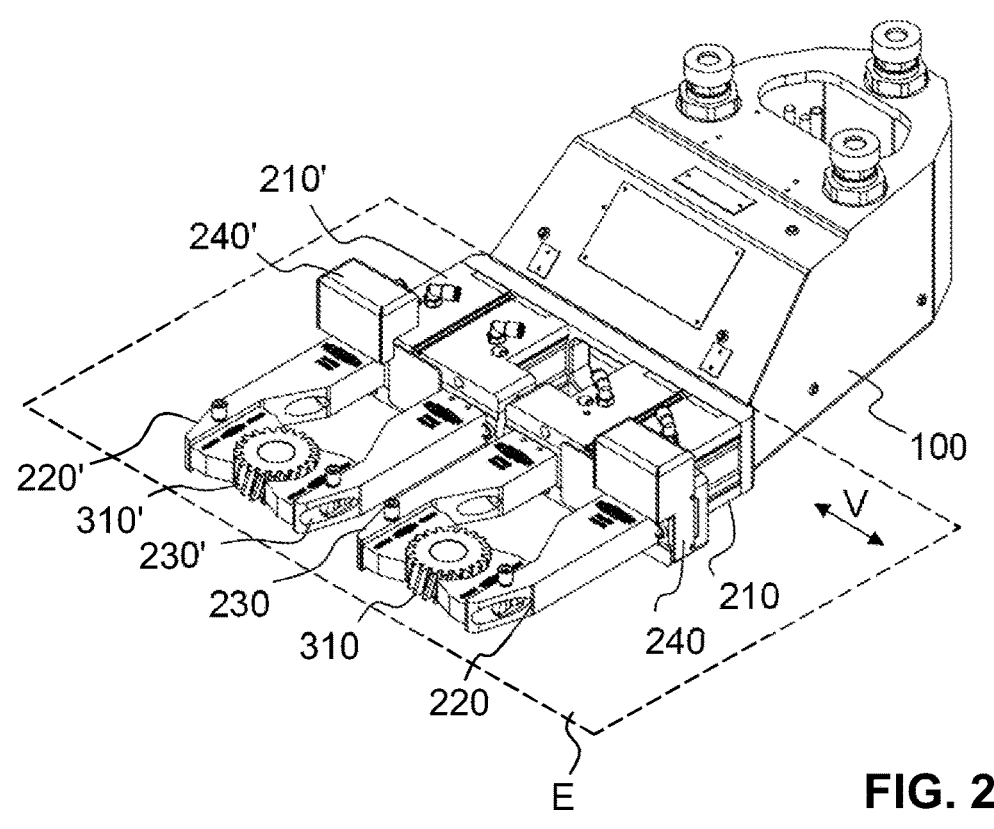
FIG. 2 shows a gripping device with two gripper units in a perspective view.
Figure 3:
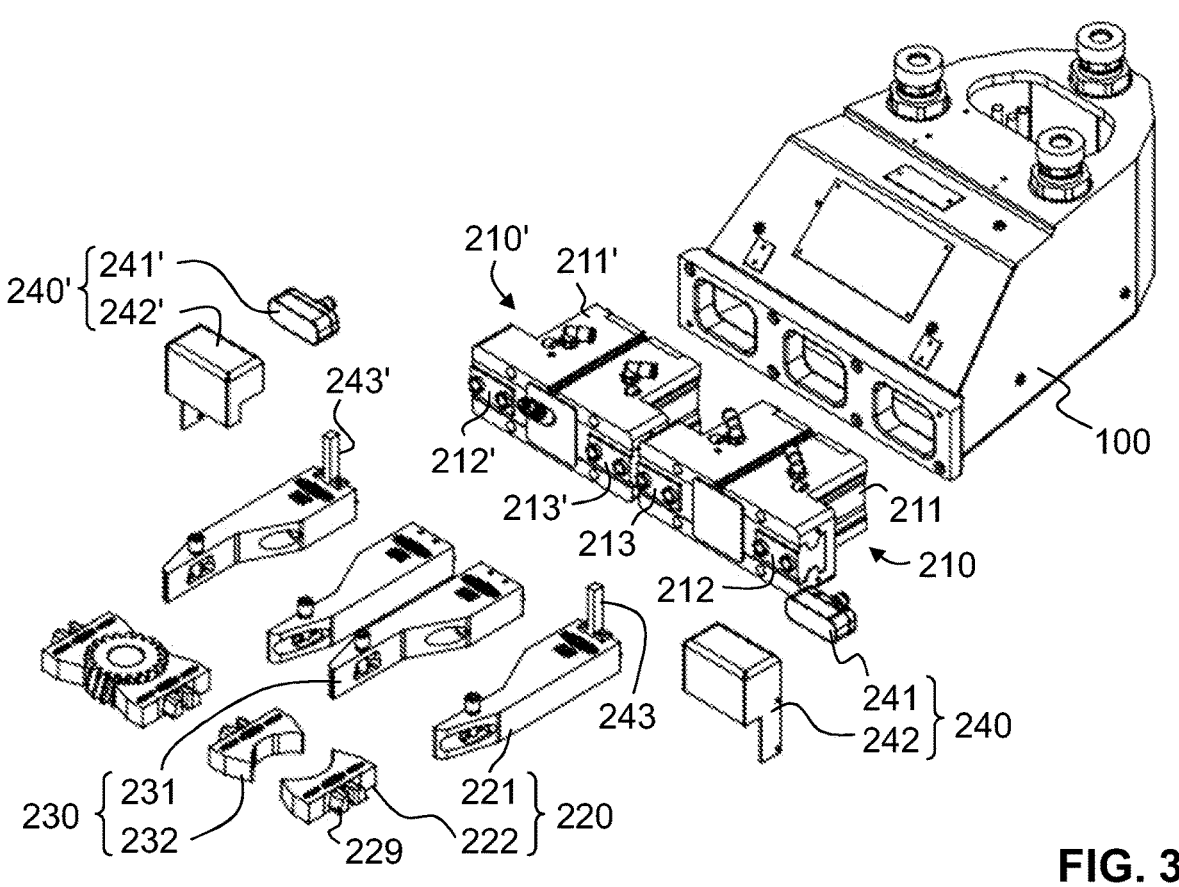
FIG. 3 shows the gripping device of FIG. 1 in an exploded view.

FIGS. 2 and 3 show a gripping device in the form of a gripper arm with two gripper units 210, 210', each of these gripper units being constructed according to FIG. 1. The gripper units 210, 210' are mounted side by side on a common holder 100 in the form of a swivel arm. They are of substantially identical construction and are mounted in a mirror-inverted manner to each other with respect to a vertical mirror plane extending centrally between the gripper units 210, 210'. Each of the further components connected to each gripper unit is also arranged in a mirror-inverted manner to the respective component on the other gripper unit.

The gripper unit arranged on the right in FIG. 2 and all components connected to it are designated in the following with reference signs without a prime. The gripper unit arranged on the left in FIG. 2 and all components connected to it are designated with the same reference signs with a prime.

The base jaws 212, 213, 212', 213' of the two gripper units 210, 210' are all displaceable collinearly with respect to one another along the displacement direction V in a common gripper plane E. That base jaw 213, 213' of each gripper unit which is arranged adjacent to a base jaw of the respective other gripper unit is hereinafter referred to as the "inner base jaw", and the other two base jaws 212, 212' are referred to as the "outer base jaws". The inner base jaws 213, 213' are arranged between the outer base jaws 212, 212' with respect to the displacement direction V.

In the embodiment of FIGS. 2 and 3, the gripping device is designed as a double gripper. For this purpose, a gripper finger 220, 230, 220', 230' is mounted on each of the base jaws 212, 213, 212', 213'. The gripper fingers 220, 230 on the base jaws 212, 213 of the first gripper unit 210 are formed and arranged to receive a gear-shaped workpiece 310 therebetween. To grip the workpiece 310, the first gripper unit 210 moves the base jaws 212, 213 synchronously towards each other, preferably under the action of a closing return force of a return spring. As a result, the workpiece 310 is held in a force-fitting manner by an inwardly directed gripping force between the gripper fingers 220, 230. To release the workpiece 310, the first gripper unit 210 synchronously moves the base jaws 212, 213 away from each other. Mirror-symmetrically to the gripper fingers 220, 230 on the first gripper unit 210, the gripper fingers 220', 230' on the second gripper unit 210' are also formed and arranged such that another workpiece 310' can be received between them. To grip and release the workpiece 310', the second gripper unit 210' synchronously moves the base jaws 212', 213' towards or away from each other. This is done independently of the actuation of the first gripper unit 210. In total, two workpieces can thus be picked up and deposited with the gripping device independently of each other.

The gripper fingers 220, 230, 220', 230' are of modular construction. For example, the gripper finger 220 includes a base finger 221 and a gripper jaw 222. The base finger 221 has a proximal end and a distal end. At its proximal end, the base finger 221 is detachably mounted to the outer base jaw 212 of the first gripper unit 210. The mounting may be accomplished, for example, by a threaded connection not illustrated. To increase positioning accuracy, positioning sleeves may be provided on the base jaws in a manner known per se. The gripper jaw 222 is laterally mounted to the base finger 221 in a region located between the proximal end and the distal end of the base finger 221. This connection is also releasable. In the present example, the mounting of the gripper jaw 222 to the base finger 221 is accomplished by a quick-change device, which will be explained in further detail below. The gripper finger 230 is constructed analogously to the gripper finger 220, also with a base finger 231 and a gripper jaw 232. The gripper jaws 222, 232 face each other so that they can receive the workpiece 310 between them. In doing so, each gripper jaw contacts the workpiece 310 in at least two locations along its circumference to prevent the workpiece from tilting. The structure of the gripper fingers 220', 230' is a mirror image of the gripper fingers 220, 230.

Due to the modular design, the gripper fingers can be adapted very quickly and easily to different workpieces, e.g. to gears with different diameters, by simply replacing the gripper jaws.

Each of the gripper units 210, 210' is provided with a position sensing device 240, 240' for determining the operating state of the respective gripper unit 210, 210'. The position sensing device 240, 240' determines in each case the position of a target 243, 243' located on the respective outer gripper finger 220, 220' near the proximal end thereof. In the present example, it comprises in each case an inductive position sensor (displacement transducer) 241, 241'. Accordingly, the target 243, 243' is at least partially made of a soft magnetic material such as a corresponding steel. To protect the position sensors, each position sensing device 240, 240' comprises a housing 242, 242' which is mounted on the base body 211, 211' of the respective gripper unit 210, 210' and covers both the respective position sensor 241, 241' and the respective target 243, 243'.

Single Gripper Design

Figure 4:
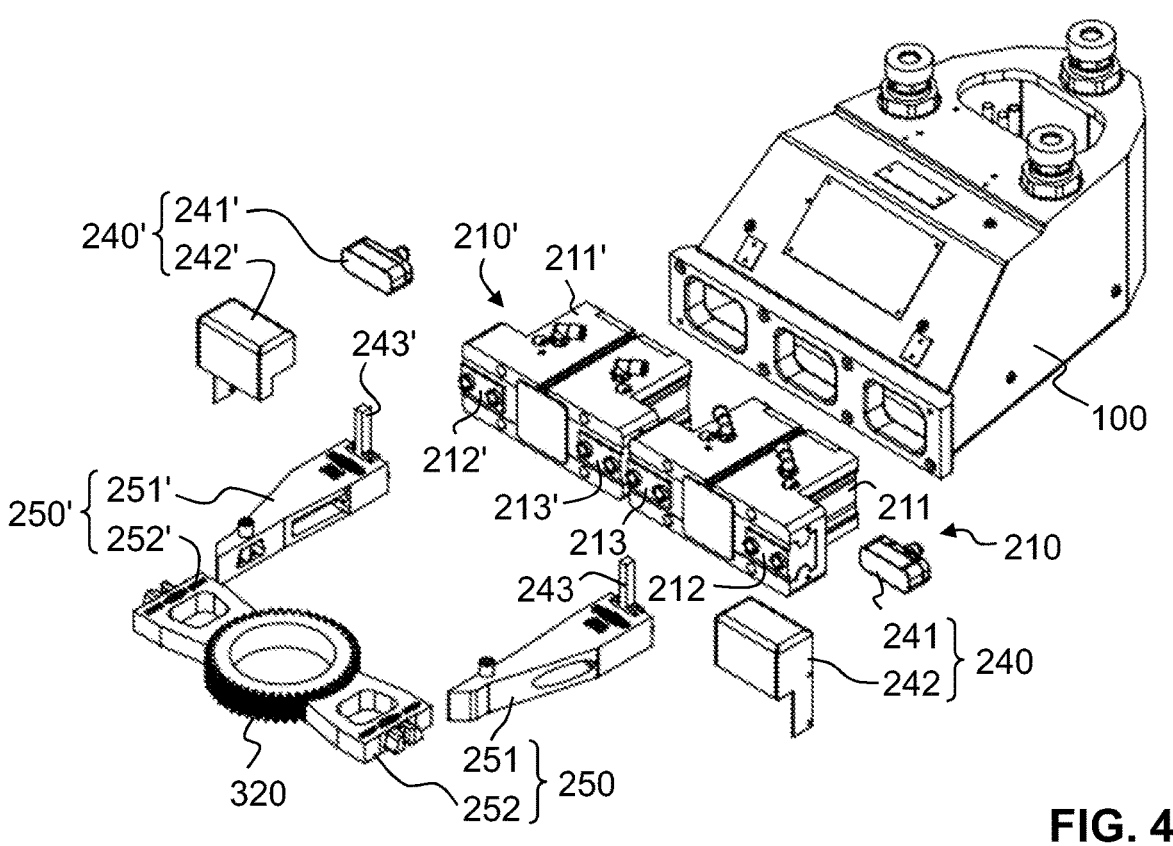
FIG. 4 shows an exploded view of the gripping device of FIG. 1 after conversion for single-gripper operation.

FIG. 4 illustrates the conversion to a single gripper. The gripper fingers 220, 230, 220', 230', which were used for operation as a double gripper, are removed from the inner and outer base jaws 212, 213, 212', 213' for this purpose. Instead, two other gripper fingers 250, 250' are now mounted on the outer base jaws 212, 212'. The inner base jaws 213, 213' remain free or are protected with a cover. They no longer take part in the gripping processes.

The gripper fingers 250, 250' are again modular, each with a base finger 251, 251' and a gripper jaw 252, 252'. The base fingers 251, 251' and gripper jaws 252, 252' are now dimensioned in such a manner that a larger workpiece 320 can be picked up between the gripper fingers 250, 250'.

In order to grip or deposit the workpiece 320, the drives of the two gripper units 210, 210' are controlled in a coupled manner such that the outer base jaws 212, 212' of the two gripper units 210, 210' move synchronously towards or away from each other.

Since each of the two outer base jaws 212, 212' belongs to a different gripper unit 210, 210' with its own drive and, if necessary, its own return spring, twice the gripping force can be achieved with this arrangement compared to a single gripper unit 210. This is of particular advantage with larger workpieces.

The gripper fingers 250, 250' again each carry a target 243, 243' for use with the position sensing devices 240, 240' to determine the operating state of both gripper units 210, 210'.

Conversion in the opposite direction, from a single gripper to a double gripper, is also easily possible.

Quick Change Device for Gripper Jaw

With reference to FIGS. 5 to 8, the mounting of gripper jaw 222 on the associated base finger 221 is explained in more detail. The other gripper jaws are mounted on the respective base finger in the same way.

As can be seen in FIG. 3, gripper jaw 222 has two parallel fastening cams 229. The elongated base finger 221 defines a finger longitudinal direction along its main extension direction. As can be seen in particular in FIGS. 5 and 7, a lateral insertion opening 223 is formed on the base finger 221 transverse to the finger longitudinal direction. The two fastening cams 229 of the gripper jaw 222 are insertable into the insertion opening 223 transversely to the finger longitudinal direction. A fixing pin 224 is attached to the base finger 221. The fixing pin 224 defines a pin longitudinal axis. It is displaceable along the pin longitudinal axis relative to the base finger 221 transversely to the finger longitudinal direction and transversely to the insertion direction of the two fastening cams 229. When the fastening cams 229 are inserted into the insertion opening 223, the fixing pin extends through a region of the insertion opening 223 located between the fastening cams 229. A transverse pin 225 extends transversely through the fixing pin 224. The transverse pin 225 forms a respective latching projection on both sides of the fixing pin 224, which latches into a corresponding recess on the underside of the fastening cams 229 when the fastening cams 229 are inserted into the insertion opening 223. In this manner, it provides a releasable snap connection between the gripper jaw 222 and the base finger 221. The fixing pin 224 extends with one end into a region located outside the base finger 221. In this region, it is surrounded by a helical spring 227. An actuating element in the form of a cap 226 is attached to the relevant end of the fixing pin 224. The cap 226 forms with its inner end face a counter stop for the helical spring 227. The helical spring 227 is compressible between the outer surface of the base finger 221 and the cap 226 in order to load the fixing pin 224 with a spring force in the direction of the position in which the transverse pin 225 fixes the fastening cams 229. In this regard, a circumferential collar 228 on the fixing pin 224 limits the range of movement of the fixing pin 224 in the direction of the spring force and ensures a certain spring bias. Axial pressure on the cap 226 and the resulting displacement of the fixing pin 224 along its pin longitudinal axis moves the transverse pin 225 out of the recesses of the fastening cams 229. As a result, the releasable snap connection is released again. In this respect, the cap 226 acts as a pushbutton.

Application in a Gear Cutting Machine

An important application of the proposed gripping device is for workpiece changing in a gear cutting machine. This is illustrated by way of example in FIGS. 5 and 6, in which an example of a gear cutting machine 400 is shown. In a manner known per se, the gear cutting machine 400 has a machine bed 410, a workpiece carrier 420, a tool carrier 430 and a machine controller 440 with control panel 441.

Figure 5:
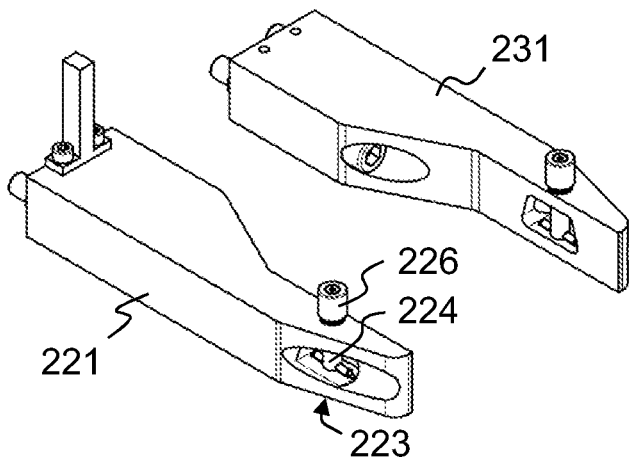
FIG. 5 shows a pair of base fingers in a perspective view.
Figure 6:
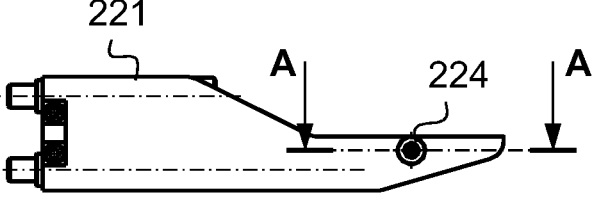
FIG. 6 shows a top view of one of the base fingers.
Figure 7:
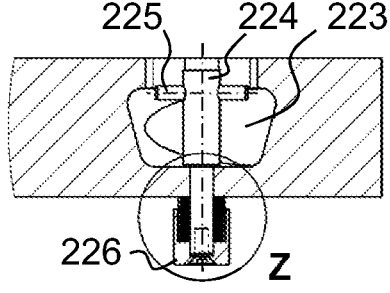
FIG. 7 shows an enlarged sectional view in the plane A-A of FIG. 6.
Figure 8:
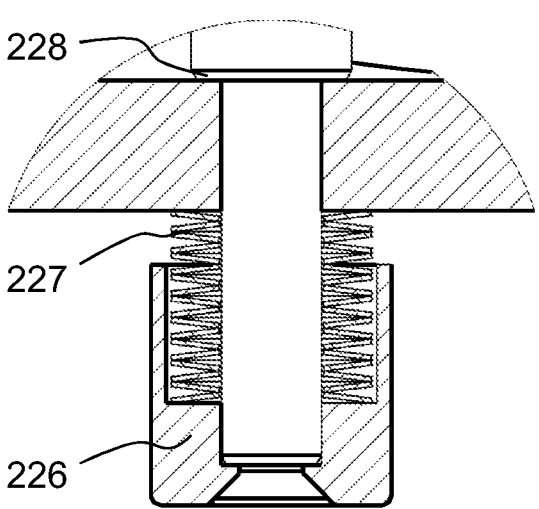
FIG. 8 shows an enlarged section of FIG. 7 in section Z.
Figure 9:
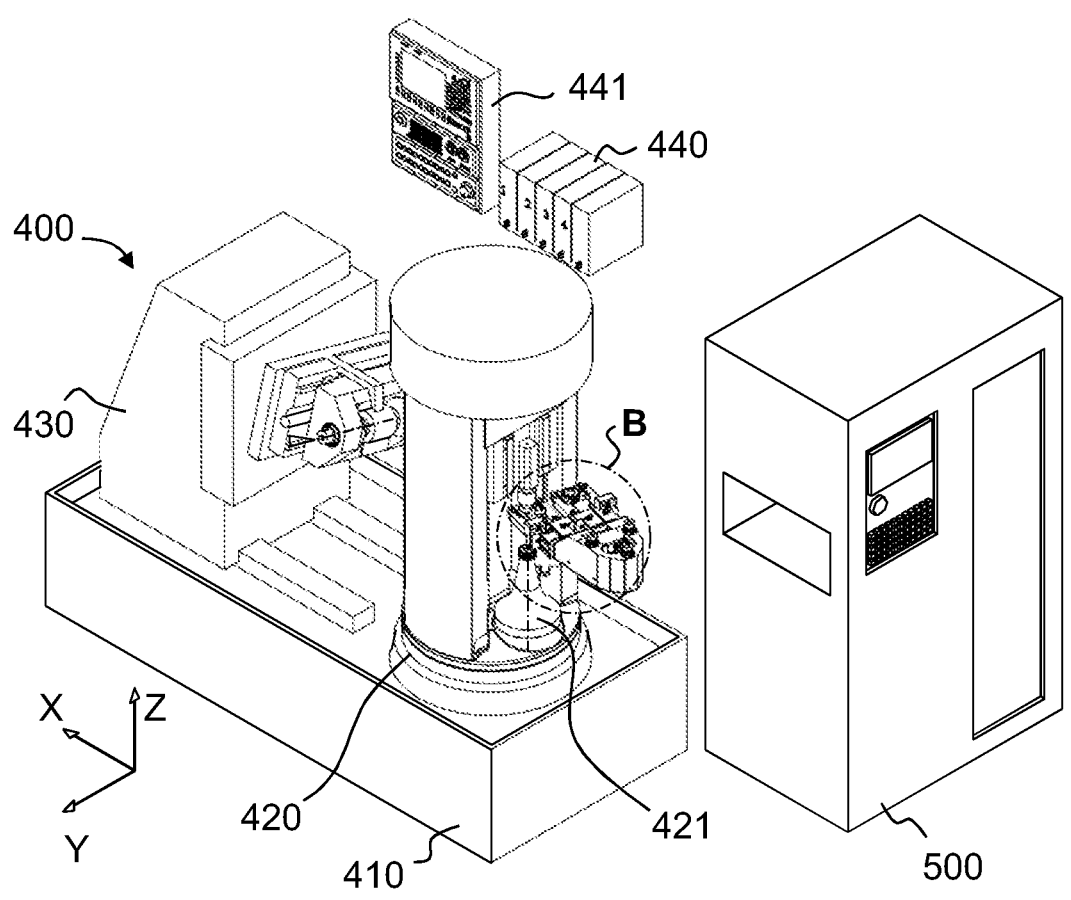
FIG. 9 shows a gear cutting machine with the gripping device of FIG. 2 in a schematic perspective view.
Figure 10:
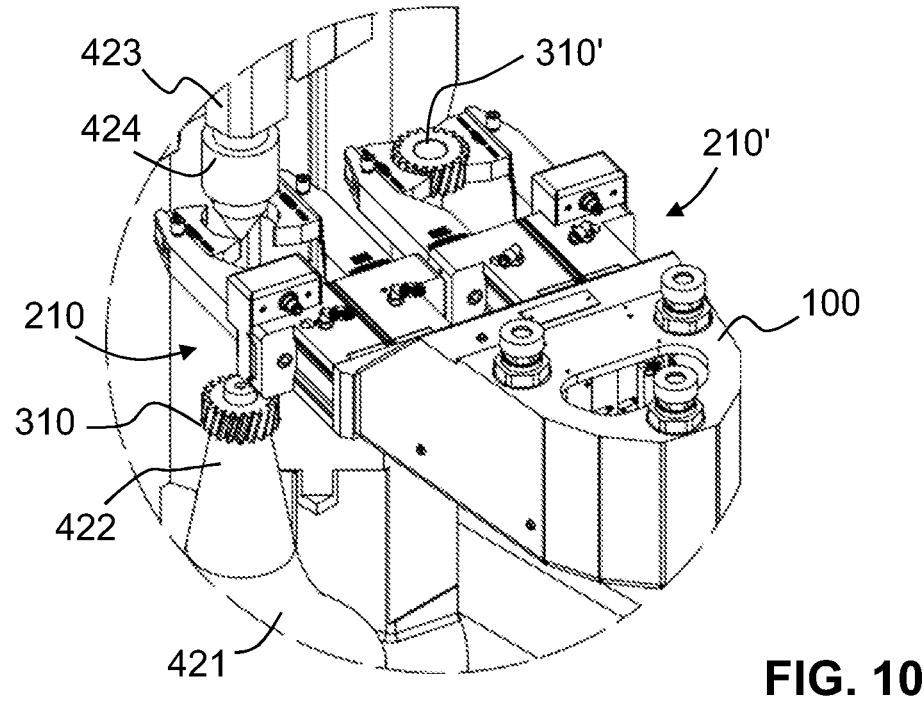
FIG. 10 shows an enlarged view of section B in FIG. 9.

The workpiece carrier 420 is designed as a turret. It carries two workpiece spindles 421, which are arranged offset from each other by 180° with respect to the vertical swivel axis of the turret. In FIG. 5, only one of these workpiece spindles is visible. This workpiece spindle is in a workpiece change position, in which a finished part can be removed from the workpiece spindle and a new blank can be clamped. The other workpiece spindle is hidden by the turret in FIG. 5. It is in a machining position in which a previously clamped workpiece can be machined by the tool on the tool carrier 430 in a manner known per se.

In order to exchange a workpiece on the workpiece spindle 421 that is in the workpiece exchange position, the gripping device described above is used in double gripper operation in the example of FIG. 5. The gripping device, which is designed as a gripper arm, is attached to a gripper arm carrier that is not shown. The gripper arm carrier is arranged stationary next to the machine bed 410, but is not connected to the machine bed for reasons of decoupling vibrations. The gripping device is attached to the gripper arm carrier in such a way that it can be swiveled relative to the gripper arm carrier by means of corresponding drives about a vertical swivel axis running parallel to the Z-direction and can be moved linearly in the Z-direction (i.e. along the vertical).

A finished workpiece 310 (finished part) is located in a workpiece clamping 422 of the workpiece spindle 421. The associated tailstock 423 with centering tip 424 is retracted upward. The gripping device is swiveled in from a position in which it is outside the working space of the gear cutting machine 400 to the swivel position shown in FIGS. 5 and 6, and is lowered in the Z-direction so that the first gripper unit 210 with the gripper fingers attached to it can pick up the finished part 310 from the workpiece spindle. The gripping device removes the finished part 310 from the workpiece clamping 422 by a short stroke movement. Meanwhile, the second gripper unit 210' is already holding the next workpiece (blank) 310' to be machined. The gripping device is now swiveled further by a small amount so that the blank 310' comes to rest above the workpiece fixture 422, and is lowered again in the Z direction so that the blank 310' can be deposited on the workpiece fixture 422. The blank 310' is now clamped on the workpiece clamping fixture 422. The gripping device is raised again in the Z direction and swiveled out of the working area to a workpiece storage 500. There the finished part 310 previously picked up by the gripper unit 210 is deposited, and a new blank is picked up by the gripper unit 210'. Meanwhile, the blank 310' is additionally fixed and centered by means of the centering tip 424, and a meshing operation is performed by means of a meshing device not shown, in order to determine the angular position of the toothing of the blank 310' relative to the workpiece spindle axis. The workpiece carrier 420 is now swiveled by 180° so that the workpiece spindle 421 with the blank 310' clamped thereon moves into the machining position, while the other workpiece spindle with another finished part on it moves into the workpiece change position. The blank 310' is now machined by the tool, and the cycle described is repeated for the further finished part.

The workpiece is therefore changed while another workpiece is being machined. The workpiece change takes place very quickly, because only a few short linear and swiveling movements are required to remove a finished part from one of the workpiece spindles and replace it with a new blank. In particular, the gripping device does not need to be swiveled between the workspace of the gear cutting machine 400 and the workpiece storage 500 for this purpose. As a result, the entire workpiece change can be performed within the processing time in which the other blank is being machined, and unproductive idle time is minimized.

However, operation as a double gripper is only possible for relatively small workpieces. If larger workpieces are to be processed, the gripping device is therefore converted for operation as a single gripper, as described above. With the single gripper, much larger workpieces can now be loaded and unloaded. The maximum diameter of workpieces that can be handled in single-gripper operation can exceed the maximum diameter of workpieces that can be handled in double-gripper operation by more than 2.5 times. As before, workpiece changeover is possible parallel to the processing time. However, the gripping device must now be swiveled completely back and forth between the work area of the gear cutting machine 400 and the workpiece storage 500 between the removal of the finished part and the clamping of the next blank. This requires more time than the short linear and swiveling movements of the double gripper. On the other hand, however, the machining of larger workpieces also generally requires more time, so that here, too, the unproductive non-productive times can be kept small despite the greater overall cycle time.

Control and Monitoring of Operating State

All movements of the gripping device relative to the gripper arm carrier as well as the actuations of the two gripper units 210, 210' are controlled by a control device, in short "controller". A separate controller may be provided for this purpose. Alternatively, this task can also be performed by the controller 440 of the machine tool or by a controller of the workpiece storage 500. For this purpose, the corresponding controller has corresponding software.

In particular, the software can distinguish between two operating modes: a first mode in which the gripping device is operated as a double gripper, and a second mode in which the gripping device is operated as a single gripper. In the first operating mode, the two gripper units are opened and closed independently of each other, while in the second operating mode, the two gripper units are opened and closed simultaneously in a coupled manner.

Switching between the operating modes can be performed manually by making a corresponding entry on the control panel. However, it is also conceivable to provide presence sensors on the base jaws of the gripper units that determine whether a gripper finger is attached to the base jaw in question and to switch automatically between the first and second operating modes on the basis of the signals from these sensors.

The controller preferably receives position signals for the two gripper units from the position sensing devices 240, 240'. Based on these position signals, it can in particular distinguish between the following states:

associated gripper unit is open;

associated gripper unit is completely closed; and associated gripper unit is partially closed, workpiece gripped.

It is also possible to check whether the determined position of the gripper units in the "workpiece gripped" state corresponds to the expected position. If the determined position deviates from the expected position by more than a predetermined tolerance range (e.g. ±1 mm), the controller may conclude that an error has occurred, and further processing may be stopped. In this way, it can be prevented that blanks with an incorrect diameter reach the workpiece spindle, where they could damage the centering device and/or the machining tool.

Modifications

Of course, a large number of variations can be made without leaving the scope of the invention.

For example, the gripper units may have a greater distance along the displacement direction V than in the exemplary embodiment discussed above, in order to be able to pick up even larger workpieces in single-gripper operation. For adaptation to different diameters, the gripper units 210, 210' may be mounted on the holder 100 so as to be displaceable along the displacement direction V. For this purpose, the holder 100 may optionally have a corresponding rail on which the gripper units are displaceably mounted.

The gripper units may also be designed as two-jaw angular grippers instead of two-jaw parallel grippers. Accordingly, the base jaws would not move linearly relative to the base body of the respective gripper unit, but would swivel. The swiveling movement still takes place for all base jaws in the gripper plane E. In order to avoid collisions, the gripper units in this case are preferably mounted at a somewhat greater distance along the direction V than in the exemplary embodiment discussed above.

The gripper units may be driven electrically instead of pneumatically.

The quick-change device for the gripper jaws may also be designed differently than shown. In particular, the actuating element may also be designed as a flat disk instead of a cap. Instead of a transverse pin, latching projections on the fixing pin can also be formed in other ways.

The gripping device may be used not only for external gears (spur gears), but also for other types of workpieces, especially other types of workpieces with cylindrical external contours. Adaptation to different workpieces is possible in a very short time by changing the gripper jaws.

It is also conceivable to use the gripping device for picking up internally toothed gears or other objects on the inner circumference. For this purpose, the gripper fingers may be provided, for example, with downwardly projecting pins or downwardly projecting and outwardly directed gripper jaws. To pick up an object, the gripper units in this case perform opening instead of closing movements. Accordingly, for safety reasons it may be advantageous to use gripping devices whose return spring generates an opening return force.

Instead of inductive position sensors (displacement transducers), other types of position sensors can be used to detect the operating state, e.g. optical distance sensors or eddy current sensors.

| LIST OF REFERENCE SIGNS | |
|---|---|
| 100 | holder |
| 210, 210' | gripper unit |
| 211, 211' | base body |
| 212, 212' | outer base jaw |
| 213, 213' | inner base jaw |
| 214 | hose connection |
| 220, 220' | outer gripper finger |
| 221, 231 | base finger |
| 222, 232 | gripper jaw |
| 223 | insertion opening |
| 224 | fixing pin |
| 225 | transverse pin |
| 226 | cap |
| 227 | helical spring |
| 228 | collar |
| 229 | fastening cam |
| 230, 230' | inner gripper finger |
| 240 | position sensing system |
| 241 | position sensing device |
| 242 | cover |
| 243 | target |
| 250, 250' | gripper finger |
| 251, 251' | base finger |
| 252, 252' | gripper jaw |
| 310, 310' | workpiece |
| 320 | workpiece |
| 410 | machine bed |
| 420 | workpiece carrier |
| 421 | workpiece spindle |
| 422 | workpiece clamping |
| 423 | tailstock |
| 424 | centering tip |
| 430 | tool carrier |
| 440 | machine controller |
| 441 | control panel |
| 500 | workpiece storage |
| E | gripper plane |

The invention claimed is:

1. A gripping device, comprising:
a holder; and
two gripper units,
wherein each of the gripper units comprises a base body with a drive and two base jaws, wherein the base jaws are synchronously movable in opposite directions relative to the base body by the drive,
wherein the two gripper units are arranged side by side on the holder in such a way that the base jaws of both gripper units are movable parallel to a common gripper plane, wherein one of the base jaws of each gripper unit is an inner base jaw, and the other base jaw of each gripper unit is an outer base jaw, wherein the inner base jaws of the two gripper units are arranged between the outer base jaws of the two gripper units, and
wherein the gripping device is configured as a single gripper, a first gripper finger being attached to each of the outer base jaws, so that a first object can be picked up with the first gripper fingers, while the inner base jaws do not carry any gripper fingers for picking up objects.

2. The gripping device according to claim 1, further comprising a controller configured to control, in a first operating mode, the drives of the two gripper units in a coupled manner such that the outer base jaws of the two gripper units are synchronously moved in opposite directions.

3. The gripping device according to claim 1, wherein the gripping device is convertible to a double gripper configuration by attaching two further first gripper fingers to the inner base jaws, or by removing the two first gripper fingers from the outer base jaws and attaching a second gripper finger to each of the outer and inner base jaws, so that a second object can be picked up with each of the two gripper units.

4. The gripping device according to claim 3, comprising:
two further first gripper fingers configured to be mounted on the inner base jaws of both gripper units, or
four second gripper fingers configured to be mounted on a respective one of the base jaws of the two gripper units after removal of the first gripper fingers so that the second object can be picked up independently with each of the two gripper units.

5. The gripping device according to claim 3, further comprising a controller configured to control, in a first operating mode, the drives of the two gripper units in a coupled manner such that the outer base jaws of the two gripper units are synchronously moved in opposite directions, the controller being switchable to a second operating mode in which the controller controls the two gripper units independently of each other.

6. The gripping device according to claim 1, wherein each of the gripper units comprises a position sensing device configured to determine a position of a target on that gripper finger that is mounted on the outer base jaw of the respective gripper unit.

7. The gripping device according to claim 6, wherein the position sensing device comprises an inductive position sensor, and wherein the target includes a soft magnetic material.

8. The gripping device according to claim 1, wherein each of the first gripper fingers comprises:
a base finger and
a gripper jaw,
wherein the base finger is releasably connected to one of the base jaws, and
wherein the gripper jaw is releasably connected to the base finger.

9. The gripping device according to claim 8, wherein the gripper jaw is connected to the base finger by a releasable snap connection.

10. The gripping device according to claim 9,
wherein the gripper jaw includes at least one fastening cam,
wherein the base finger defines a finger longitudinal direction and has a lateral insertion opening extending transversely to the finger longitudinal direction, into which the at least one fastening cam of the gripper jaw can be inserted transversely to the finger longitudinal direction,
wherein a spring-loaded fixing pin with a latching projection extending into the insertion opening is provided on the base finger, and wherein the fixing pin is formed and arranged such that the latching projection latches into a recess of the fastening cam when the fastening cam is inserted into the insertion opening to establish the releasable snap connection, and wherein that the releasable snap connection is releasable by pressure on an actuating element formed on or connected to the fixing pin.

11. A gear cutting machine comprising:

a workpiece spindle;

a workpiece storage;

a tool carrier with a tool for machining a toothed workpiece; and the gripping device according to claim 1, wherein the gripping device is configured to pick up the toothed workpieces from the workpiece spindle or the workpiece storage to effect a workpiece change in the gear cutting machine.

12. A method of operating a gripping device according to claim 1, comprising:

picking up an object with the first gripper fingers by controlling the drives of the two gripper units in a coupled manner such that the outer base jaws of the two gripper units are moved synchronously in opposite directions.

13. The method of claim 12, comprising:

converting the gripping device from a single gripper configuration to a double gripper configuration either by attaching two further first gripper fingers to the inner base jaws or by removing the two first gripper fingers from the outer base jaws and attaching a second gripper finger to each of the outer and inner base jaws.

14. The method according to claim 13, comprising:

independently controlling the drives of the two gripper units after conversion to the double gripper configuration in such a way that the base jaws of each of the two gripper units are moved synchronously in opposite directions independently of the base jaws of the respective other gripper unit.

15. The method according to claim 12, comprising:

determining a position of a respective target on those gripper fingers that are mounted on the outer base jaws of the two gripper units.

16. The method according to claim 12, wherein the object is a toothed workpiece.

17. The method according to claim 16, wherein the toothed workpiece is picked up by the gripping device from a workpiece spindle or a workpiece storage of a gear cutting machine to effect a workpiece change in the gear cutting machine.

\* \* \* \* \*